(12) United States Patent
Stuhr

(10) Patent No.: US 8,544,800 B2
(45) Date of Patent: Oct. 1, 2013

(54) INTEGRATED WINGTIP EXTENSIONS FOR JET TRANSPORT AIRCRAFT AND OTHER TYPES OF AIRCRAFT

(75) Inventor: Victor K. Stuhr, Seattle, WA (US)

(73) Assignee: The Boeing Company, Chicago, IL (US)

(*) Notice: Subject to any disclaimer, the term of this patent is extended or adjusted under 35 U.S.C. 154(b) by 1649 days.

(21) Appl. No.: 11/187,443

(22) Filed: Jul. 21, 2005

(65) Prior Publication Data

US 2007/0018049 A1 Jan. 25, 2007

(51) Int. Cl.
*B64C 23/06* (2006.01)
*B64C 9/00* (2006.01)

(52) U.S. Cl.
USPC .............. 244/199.4; 244/124; 244/87

(58) Field of Classification Search
USPC ............ 244/124, 199.4, 199.2, 218, 45 R, 244/45 A, 123.1, 130, 35, 87; 416/132 B, 416/132 R, 225
See application file for complete search history.

(56) References Cited

U.S. PATENT DOCUMENTS

| | | | |
|---|---|---|---|
| 1,354,677 A | 10/1920 | Mix | |
| 1,466,554 A | 8/1923 | Thurston | |
| 1,888,418 A | 11/1932 | Adams | |
| 2,370,801 A * | 3/1945 | Klose | 244/13 |
| 2,576,981 A | 12/1951 | Vogt | |
| 2,743,888 A | 5/1956 | Lippisch | |
| 2,749,061 A | 6/1956 | Franz | |
| 2,750,134 A | 6/1956 | Hawkins et al. | |
| 3,018,985 A | 1/1962 | Voigt | |
| 3,027,118 A | 3/1962 | Willox | |
| 3,270,988 A | 9/1966 | Cone, Jr. | |
| 3,273,833 A * | 9/1966 | Windecker | 244/123.5 |
| 3,712,564 A | 1/1973 | Rethorst | |
| 3,840,199 A | 10/1974 | Tibbs | |
| 4,045,336 A | 8/1977 | Isteri et al. | |
| 4,046,336 A | 9/1977 | Tangler | |
| 4,172,574 A | 10/1979 | Spillman | |
| 4,190,219 A * | 2/1980 | Hackett | 244/199.4 |
| 4,205,810 A | 6/1980 | Ishimitsu | |
| 4,455,004 A | 6/1984 | Whitaker | |
| 4,457,479 A | 7/1984 | Daude et al. | |
| 4,545,552 A | 10/1985 | Welles | |
| 4,671,473 A | 6/1987 | Goodson | |

(Continued)

FOREIGN PATENT DOCUMENTS

| | | |
|---|---|---|
| DE | 634884 | 7/1934 |
| EP | 0 094 064 A | 11/1983 |

OTHER PUBLICATIONS http://www.merriam-webster.com/dictionary/integrate.*
http://www.merriam-webster.com/dictionary/unitary.*

(Continued)

*Primary Examiner* — Joseph W Sanderson

(57) ABSTRACT

Methods and systems for efficiently increasing the wing area of an aircraft are disclosed herein. An integrated wingtip extension configured in accordance with one embodiment of the invention includes a tapered wing section and a winglet. The tapered wing section includes an inboard end portion having a first chord length and an outboard end portion having a second chord length that is less than the first chord length. The winglet is fixedly attached to the outboard end portion. The inboard end portion is configured to be fixedly attached to a tip portion of an aircraft wing. In one embodiment, the tapered wing section and the winglet can be integrally formed from composite materials.

19 Claims, 8 Drawing Sheets

(56) References Cited

U.S. PATENT DOCUMENTS

| | | | |
|---|---|---|---|
| 4,674,709 A | 6/1987 | Welles | |
| 4,700,911 A | 10/1987 | Zimmer et al. | |
| 4,714,215 A | 12/1987 | Jupp et al. | |
| 4,722,499 A | 2/1988 | Klug | |
| 4,776,542 A | 10/1988 | Van Dam | |
| 4,915,324 A | 4/1990 | Foreau | |
| 5,039,032 A * | 8/1991 | Rudolph | 244/35 R |
| 5,082,204 A * | 1/1992 | Croston | 244/126 |
| 5,102,068 A | 4/1992 | Gratzer | |
| 5,275,358 A | 1/1994 | Goldhammer | |
| 5,348,253 A * | 9/1994 | Gratzer | 244/91 |
| 5,407,153 A * | 4/1995 | Kirk et al. | 244/199.4 |
| 5,435,504 A | 7/1995 | Inoue | |
| 5,634,613 A | 6/1997 | McCarthy | |
| 5,692,703 A | 12/1997 | Murphy | |
| 5,788,191 A * | 8/1998 | Wake et al. | 244/199.2 |
| 5,897,078 A | 4/1999 | Burnham | |
| 5,909,858 A | 6/1999 | Hawley | |
| 5,975,464 A * | 11/1999 | Rutan | 244/120 |
| 5,992,793 A | 11/1999 | Perry et al. | |
| 6,089,502 A * | 7/2000 | Herrick et al. | 244/35 R |
| 6,161,797 A * | 12/2000 | Kirk et al. | 244/1 N |
| 6,237,873 B1 * | 5/2001 | Amaoka et al. | 244/123.7 |
| 6,345,790 B1 | 2/2002 | Brix | |
| 6,484,968 B2 | 11/2002 | Felker | |
| 6,547,181 B1 | 4/2003 | Hoisington | |
| 6,578,798 B1 | 6/2003 | Dizdarevic et al. | |
| 6,726,149 B2 * | 4/2004 | Wojciechowski | 244/123.1 |
| 6,827,314 B2 | 12/2004 | Barriety et al. | |
| 6,886,778 B2 | 5/2005 | McLean | |
| 7,048,228 B2 * | 5/2006 | Vassberg et al. | 244/35 R |
| 7,275,722 B2 * | 10/2007 | Irving et al. | 244/201 |
| 7,900,877 B1 * | 3/2011 | Guida | 244/199.4 |
| 2004/0135032 A1 * | 7/2004 | Gregg et al. | 244/123 |
| 2004/0245394 A1 | 12/2004 | Wojciechowski | |
| 2011/0127383 A1 * | 6/2011 | Guida | 244/199.4 |
| 2011/0186689 A1 * | 8/2011 | Guida | 244/199.4 |

OTHER PUBLICATIONS

Design and Analysis of Winglets for Military Aircraft, Technical Report AFFDL-TR-76-3, Feb. 1976 (p. 88-143).

Whitcomb, Richard T, NASA Technical Note, NASA TN D-8260, "A Design Approach and Selected Wind-Tunnel Results at High Subsonic Speeds for Wing-Tip Mounted Winglets," National Aeronautics and Space Administration, Washington, D.C., Jul. 1976 (33 pages).

Wing Design Parameters (4 pages); http://www.desktopaero.com/appliedaero/wingdesign/wingparams.html; [Accessed Jun. 12, 2003].

European Search Report for EP 04 07 6872; dated Sep. 14, 2004; 3 pgs.

AERO 17; Wingtip Devices; http://www.boeing.com/commercial/aeromagazine/aero_17/wingtip_devices.html; accessed Jun. 1, 2004; 5 pgs.

Wilcox et al., "Simultaneous Optimization of a Multiple-Aircraft Family", Journal of Aircraft, Jul. 2003, pp. 616-622.

PCT International Search Report and Written Opinion for PCT/US2006/024739; The Boeing Company; Nov. 2, 2006; European Patent Office; 13 pgs.

* cited by examiner

INTEGRATED WINGTIP EXTENSIONS FOR JET TRANSPORT AIRCRAFT AND OTHER TYPES OF AIRCRAFT

TECHNICAL FIELD

The following disclosure relates generally to aircraft wings and, more particularly, to tip extensions for aircraft wings.

BACKGROUND

Aircraft manufacturers often develop families of aircraft in which subsequent versions are able to carry more passengers and/or cargo than the earlier versions. Increasing the passenger and/or cargo capacity is typically accomplished by stretching the fuselage and/or increasing the wing area. One prior art approach for increasing wing area is illustrated in FIGS. 1A-2B.

FIG. 1A is a top view of a baseline wing assembly 100 configured in accordance with the prior art, and FIG. 1B is a rear view looking forward at the baseline wing assembly 100. Referring to FIGS. 1A and 1B together, the baseline wing assembly 100 includes a baseline wing 102 and a winglet 104. The winglet 104 is fixedly attached to a tip portion 106 of the baseline wing 102. Although the chord length of the tip portion 106 is minimized for aerodynamic reasons, it is still long enough to allow human access for fixedly attaching the winglet 104 to the baseline wing 102.

FIG. 2A is a top view of a derivative wing assembly 200 configured in accordance with the prior art, and FIG. 2B is a rear view looking forward at the derivative wing assembly 200. Referring to FIGS. 2A and 2B together, the derivative wing assembly 200 includes a constant-chord tip extension 208 for increasing the wing area of the baseline wing 102. The constant-chord tip extension 208 includes an outboard end portion 206 spaced apart from an inboard end portion 205. The inboard end portion 205 is fixedly attached to the tip portion 106 of the baseline wing 102, and a winglet 204 is fixedly attached to the outboard end portion 206. The winglet 204 can be at least generally similar in structure and function to the winglet 104 illustrated in FIGS. 1A and 1B.

Although it may be advantageous from an aerodynamic standpoint to taper the constant-chord tip extension 208, this is not possible from an assembly standpoint because the resulting tip chord would be too small to accommodate human access for attachment of the winglet 204. For this reason, the chord length of the outboard end portion 206 is the same as the chord length of the inboard end portion 205 (hence the term "constant-chord"). One downside of this approach, however, is that the resulting planform of the derivative wing assembly 200 is not optimized for aerodynamic performance.

SUMMARY

This summary is provided for the benefit of the reader only, and is not intended to limit the invention as set forth by the claims.

The present invention is directed generally to integrated wingtip extensions for use with jet transport aircraft and other types of aircraft. A wingtip extension configured in accordance with one aspect of the invention includes a tapered wing section and a winglet. The tapered wing section has an inboard end portion with a first chord length and an outboard end portion with a second chord length that is less than the first chord length. The winglet is fixedly attached to the outboard end portion of the tapered wing section.

In one embodiment, the outboard end portion of the tapered wing section can be spaced apart from the inboard end portion by a spanwise dimension that is at least as long as the second chord length. In another embodiment, the tapered wing section can further include a first trailing edge portion that is configured to be aligned with a second trailing edge portion of an aircraft wing when the tapered wing section is fixedly attached to the aircraft wing. In a further embodiment, the tapered wing section and the winglet can be integrally formed from composite materials.

Another aspect of the invention is directed to a method for increasing the wing area of a baseline aircraft having a baseline wing. The method includes fixedly attaching an inboard end portion of a tapered wing section to a tip portion of the baseline wing, and fixedly attaching a winglet to an outboard end portion of the tapered wing section. The inboard end portion has a first chord length and the outboard end portion has a second chord length that is less than the first chord length. In one embodiment, fixedly attaching a winglet to the outboard end portion of the tapered wing section can include manufacturing the winglet and the tapered wing section together as an integral composite structure.

A derivative aircraft configured in accordance with another aspect of the invention includes a baseline wing from a baseline aircraft, a tapered wing section, and a winglet. The baseline wing has a first tip portion spaced apart from a first root portion. The tapered wing section has a second tip portion spaced apart from a second root portion. The second root portion has a first chord length and the second tip portion has a second chord length that is less than the first chord length. The derivative aircraft further includes means for fixedly attaching the second root portion of the tapered wing section to the first tip portion of the baseline wing. In addition, the derivative aircraft also includes means for fixedly attaching the winglet to the second tip portion of the tapered wing section. In one embodiment, the means for fixedly attaching the winglet to the second tip portion of the tapered wing section include means for manufacturing the winglet and the tapered wing section together as an integral composite structure.

DETAILED DESCRIPTION

The following disclosure describes systems and methods for increasing the wing area on various types of baseline aircraft. Certain details are set forth in the following description to provide a thorough understanding of various embodiments of the invention. Other details describing well-known structures and systems often associated with aircraft, aircraft wings, and/or winglets are not set forth below, however, to avoid unnecessarily obscuring the description of the various embodiments of the invention.

Many of the details, dimensions, angles and other features shown in the Figures are merely illustrative of particular embodiments of the invention. Accordingly, other embodiments can have other details, dimensions, angles and features without departing from the spirit or scope of the present invention. Furthermore, additional embodiments of the invention can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 308 is first introduced and discussed with reference to FIG. 3.

Figure 1A:
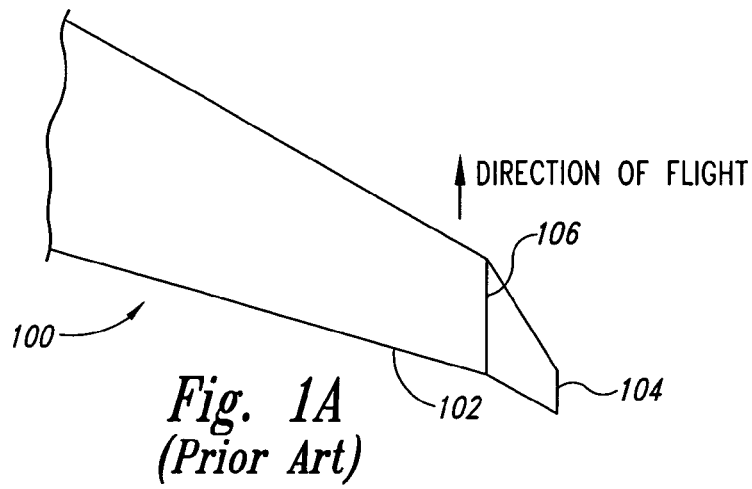
FIGS. 1A and 1B are top and rear views, respectively, of a baseline wing assembly configured in accordance with the prior art.
Figure 1B:
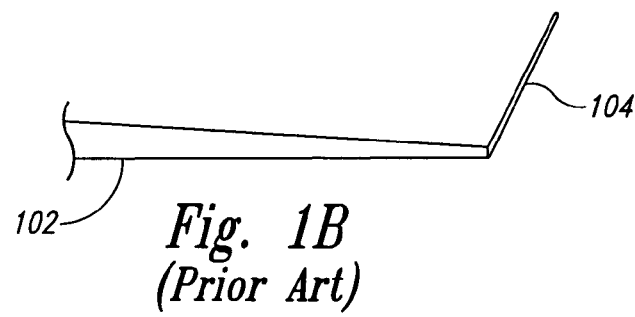
Figure 2A:
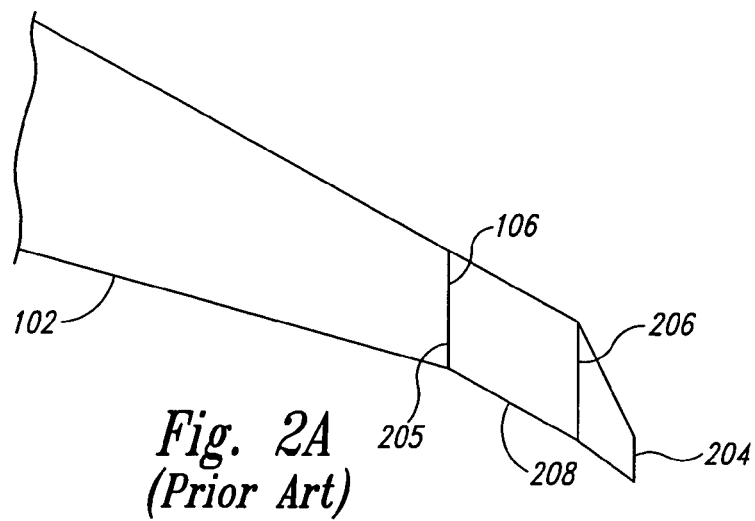
FIGS. 2A and 2B are top and rear views, respectively, of a derivative wing assembly configured in accordance with the prior art.
Figure 2B:
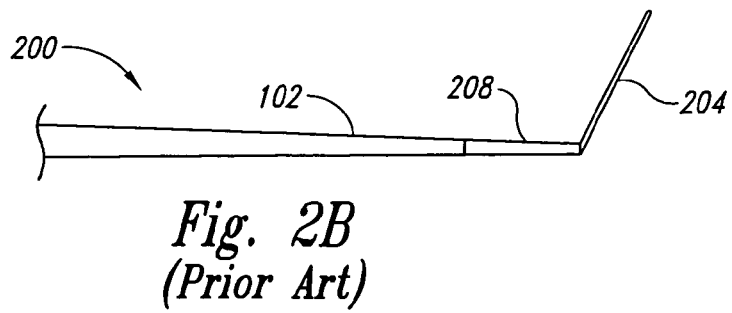
Figure 3A:
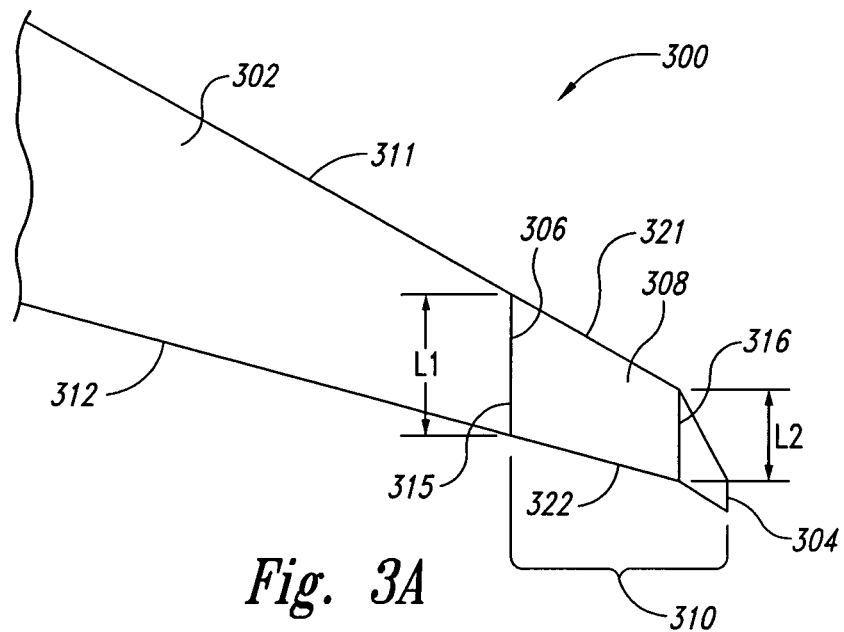
FIGS. 3A and 3B are top and rear views, respectively, of a derivative wing assembly configured in accordance with an embodiment of the invention.
Figure 3B:
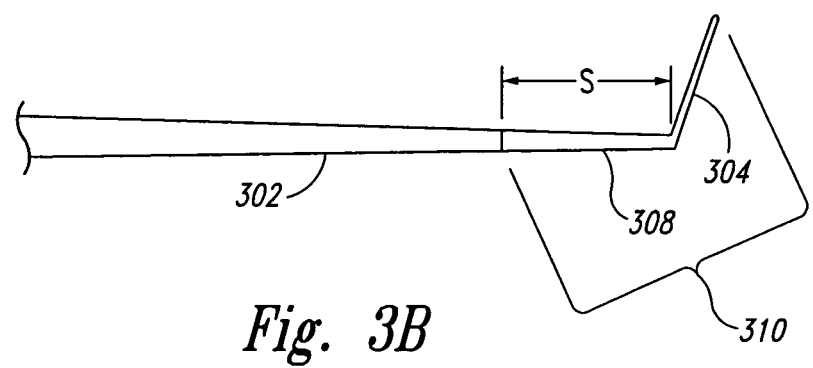

FIGS. 3A and 3B are top and rear views, respectively, of a derivative wing assembly 300 having an integrated tip extension 310 configured in accordance with an embodiment of the invention. Referring to FIGS. 3A and 3B together, the integrated tip extension 310 includes a tapered wing section 308 and a winglet 304. The tapered wing section 308 includes an outboard end portion 316 spaced apart from an inboard end portion 315 by a spanwise dimension S. The inboard end portion 315 has a first chord length L1 and the outboard end portion 316 has a second chord length L2 that is less than the first chord length L1. In the illustrated embodiment, the spanwise dimension S is at least as long as the second chord length L2. The inboard end portion 315 is fixedly attached to a tip portion 306 of a baseline wing 302. The winglet 304 is fixedly attached to the outboard end portion 316. As discussed in greater detail below, tapering the integrated tip extension 310 from the inboard end portion 315 to the outboard end portion 316 as illustrated in FIG. 3A can increase the aerodynamic efficiency of the derivative wing assembly 300 over the prior art derivative wing assembly 200 described above with reference to FIGS. 2A and 2B.

The tapered wing section 308 further includes a first leading edge portion 321 and a first trailing edge portion 322. The baseline wing 302 further includes a second leading edge portion 311 and a second trailing edge portion 312. In one aspect of this embodiment, the first leading edge portion 321 is at least approximately aligned with the second leading edge portion 311, and the first trailing edge portion 322 is at least approximately aligned with the second trailing edge portion 312, when the tapered wing section 308 is fixedly attached to the baseline wing 302 as illustrated in FIG. 3A. As described in greater detail below, other embodiments of the invention can include wingtip extensions where one or both of the leading and trailing edges are not aligned with the corresponding leading and trailing edges of the baseline wing.

Although the winglet 304 is illustrated in FIG. 3B extending upwardly relative to the baseline wing 302, in other embodiments, the winglet 304 can extend in other directions relative to the baseline wing 302. For example, in one embodiment, the winglet 304 can extend at least approximately downwardly relative to the baseline wing 302. In another embodiment, the winglet 304 can extend outwardly in alignment with the baseline wing 302. Accordingly, aspects of the present invention are not limited to the relative positioning of the winglet 304, but extend to all winglet and/or wingtip extensions falling within the scope of the claims.

The integrated tip extension 310 can be manufactured in a number of different ways using a number of different materials. In one embodiment, for example, the integrated tip extension 310 can be manufactured from aluminum and/or other lightweight metals using "conventional" aircraft construction techniques. In another embodiment, the winglet 304 and the tapered wing section 308 can be manufactured concurrently from fiber-reinforced resin materials (e.g., graphite/epoxy materials) and/or other composite materials using suitable composite manufacturing techniques.

With either of these approaches, it may be advantageous to manufacture the tapered wing section 308 and the winglet 304 together as a single unit rather than having to mechanically or otherwise join the two parts together after manufacturing. Doing so eliminates the need for human access to manually attach the winglet 304 to the tapered wing section 308. As a result, the second chord length L2 of the outboard end portion 316 can be reduced beyond the first chord length L1 of the inboard end portion 315 to maintain the taper of the baseline wing 302 or to otherwise optimize the planform of the derivative wing assembly 300 as desired.

As mentioned above, one feature of the derivative wing assembly 300 is that the tapered wing section 308 can be shaped as desired to optimize wing planform. One advantage of this feature over conventional tip extensions is that it can increase the aerodynamic efficiency of the overall wing configuration. For example, the prior art derivative wing assembly 200 discussed above with reference to FIGS. 2A and 2B is constrained to a constant-chord wing section 208 which does not maintain the taper of the baseline wing 102. As a result, the drag characteristics of the prior art derivative wing assembly 200 suffer. In contrast, because the integrated tip extension 310 of the present invention is not constrained to a constant-chord planform, the integrated tip extension 310 can be shaped for improved aerodynamic characteristics while at the same time increasing the wing area to accommodate a stretched fuselage and/or an increased passenger load.

Figure 4A:
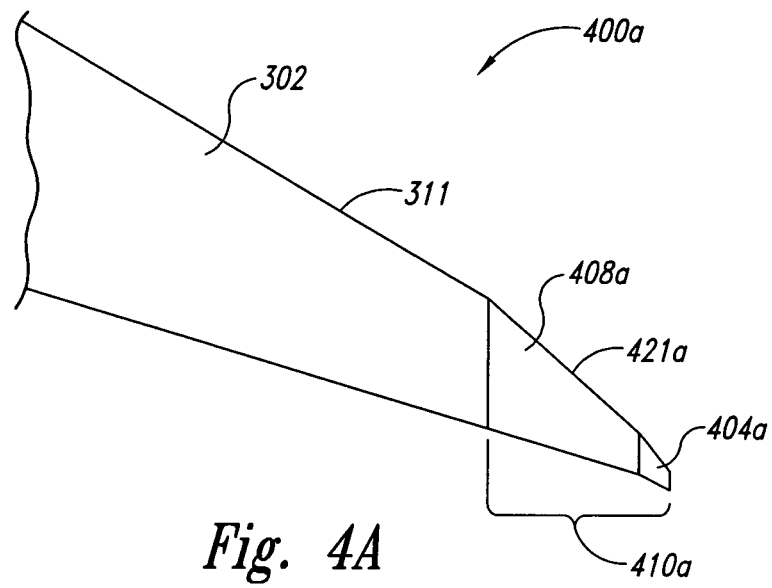
FIGS. 4A and 4B are top views of derivative wing assemblies configured in accordance with other embodiments of the invention.
Figure 4B:
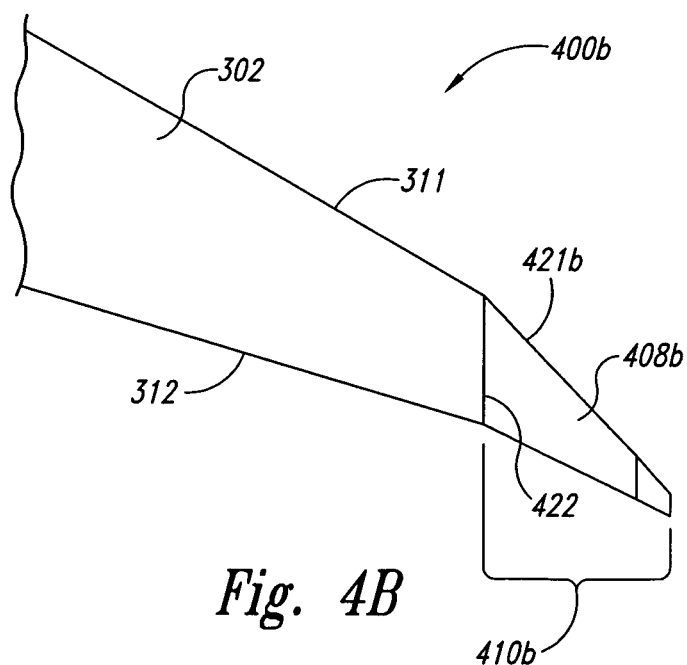

FIGS. 4A and 4B are top views of derivative wing assemblies 400a and 400b, respectively, configured in accordance with other embodiments of the invention. Referring to FIG. 4A, the derivative wing assembly 400a includes an integrated tip extension 410a composed of a tapered wing section 408a and a winglet 404a. The integrated tip extension 410a can be at least generally similar in structure and function to the integrated tip extension 310 described above with reference to FIGS. 3A and 3B. One difference, however, is that the tapered wing section 408a includes a first leading edge portion 421a that is swept aft relative to the second leading edge portion 311 of the baseline wing 302.

Referring next to FIG. 4B, the derivative wing assembly 400b includes an integrated tip extension 410b that can be at least generally similar in structure and function to the integrated tip extension 410a illustrated in FIG. 4A. One difference, however, is that the integrated tip extension 410b includes a tapered wing section 408b having a first leading edge portion 421b that is swept aft relative to the second leading edge portion 311 of the baseline wing 302, and a first trailing edge portion 422 that is swept aft relative to the second trailing edge portion 312 of the baseline wing 302.

Figure 5:
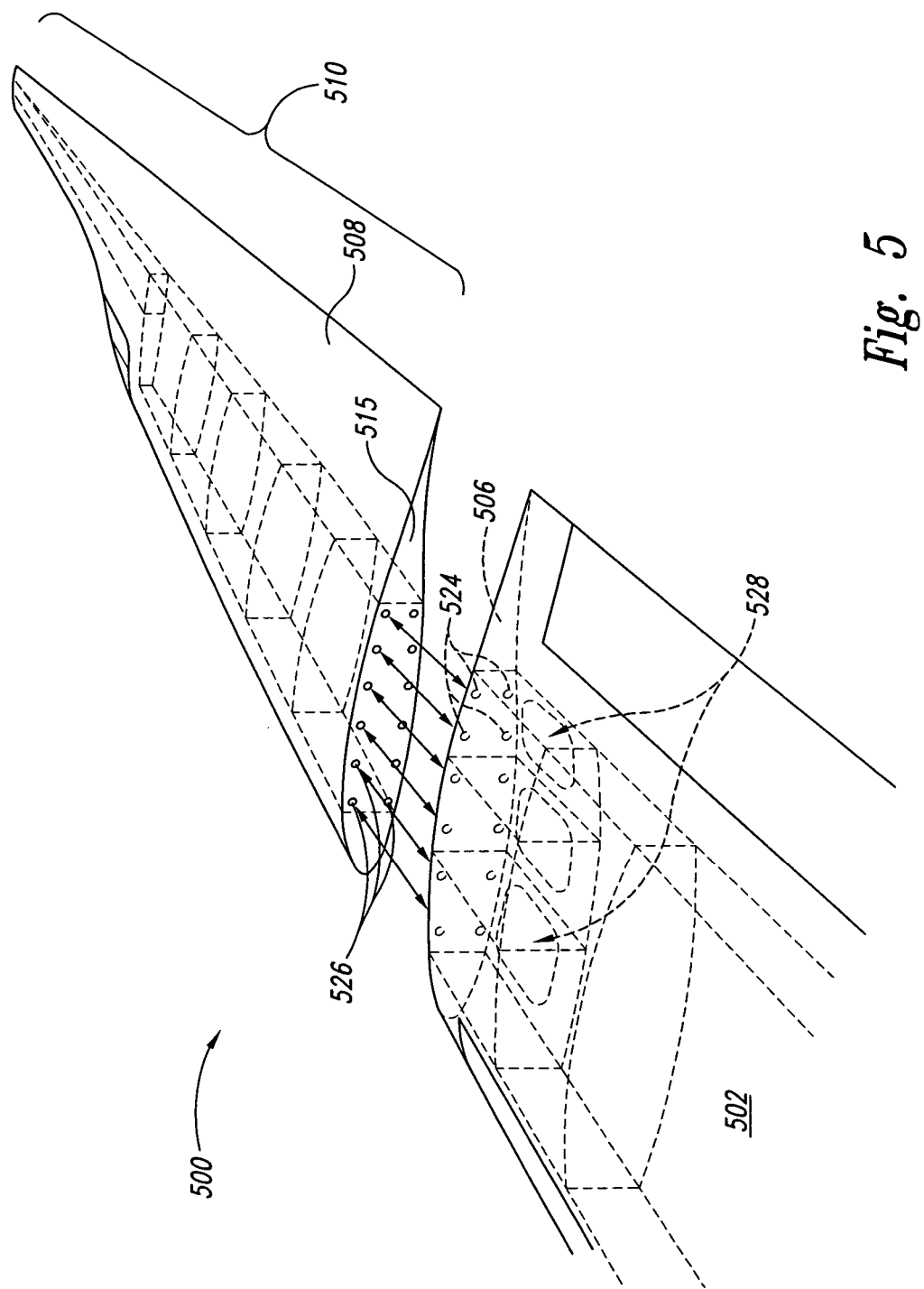
FIG. 5 is an exploded isometric view of a wing and a wingtip extension illustrating a structural connection configured in accordance with an embodiment of the invention.

FIG. 5 is an exploded isometric view of a derivative wing 500 illustrating one method for attaching an integrated tip extension 510 to a baseline wing 502 in accordance with an embodiment of the invention. In this embodiment, the integrated tip extension 510 includes a plurality of first bolt holes 526 extending through an inboard end portion 515. The baseline wing 502 can similarly include a plurality of corresponding second bolt holes 524 extending through an opposing tip portion 506. A plurality of tension bolts or other suitable fasteners (not shown) passing through the first bolt holes 526 and the second bolt holes 524 can be used to fixedly attach the integrated tip extension 510 to the baseline wing 502. The baseline wing 502 and/or the integrated tip extension 510 can further include one or more access ports 528 to facilitate bolt installation. Because the foregoing manner of structural attachment lacks the strength of a direct spar-to-spar joint, this approach may be most suitable for integrated tip extensions having relatively short spans and/or for smaller aircraft having relatively lower gross weight requirements.

Figure 6:
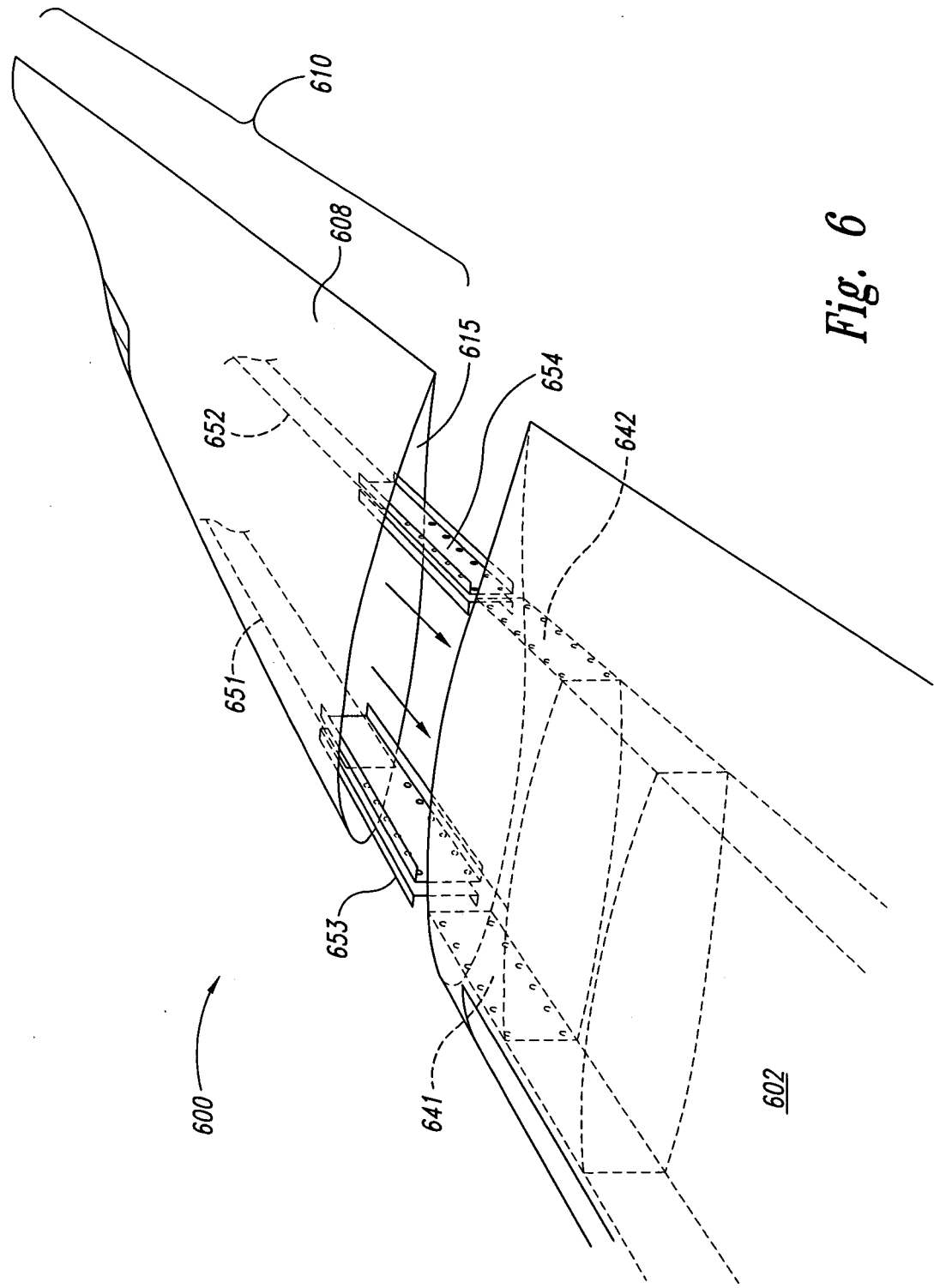
FIG. 6 is an exploded isometric view of a wing and a wingtip extension illustrating a structural connection configured in accordance with another embodiment of the invention.

FIG. 6 is an exploded isometric view of a derivative wing assembly 600 illustrating another method for structurally attaching an integrated tip extension 610 to a baseline wing 602 in accordance with an embodiment of the invention. In this embodiment, the integrated tip extension 610 includes a tapered wing section 608 having a first front spar 651 and a first rear spar 652. The first front spar 651 is aligned with a corresponding second front spar 641 of the baseline wing 602, and the first rear spar 652 is similarly aligned with a second rear spar 642 of the baseline wing 602. A front spar extension 653 is fixedly attached to the first front spar 651, and extends beyond an inboard end portion 615 of the tapered wing section 608. Similarly, a rear spar extension 654 is fixedly attached to the first rear spar 652, and extends beyond the inboard end portion 615. When the inboard end portion 615 of the tapered wing section 608 is butted against a tip portion 606 of the baseline wing 602, the front spar extension 653 sandwiches an adjacent portion of the second front spar 641, and the rear spar extension 654 sandwiches an adjacent portion of the second rear spar 642. Then, a plurality of bolts or other suitable fasteners (not shown) can be used to fixedly clamp the second front spar 641 in the front spar extension 653 and the second rear spar 642 in the rear spar extension 654. Attaching the spars in the foregoing manner creates a structurally efficient double-shear joint. In other embodiments, however, single shear joints can be used. Because of the relatively robust nature of the joint illustrated in FIG. 6, this method of attachment may be more suitable for use with integrated tip extensions of relatively long span and/or for use with baseline aircraft having relatively large structural loads.

Figure 7:
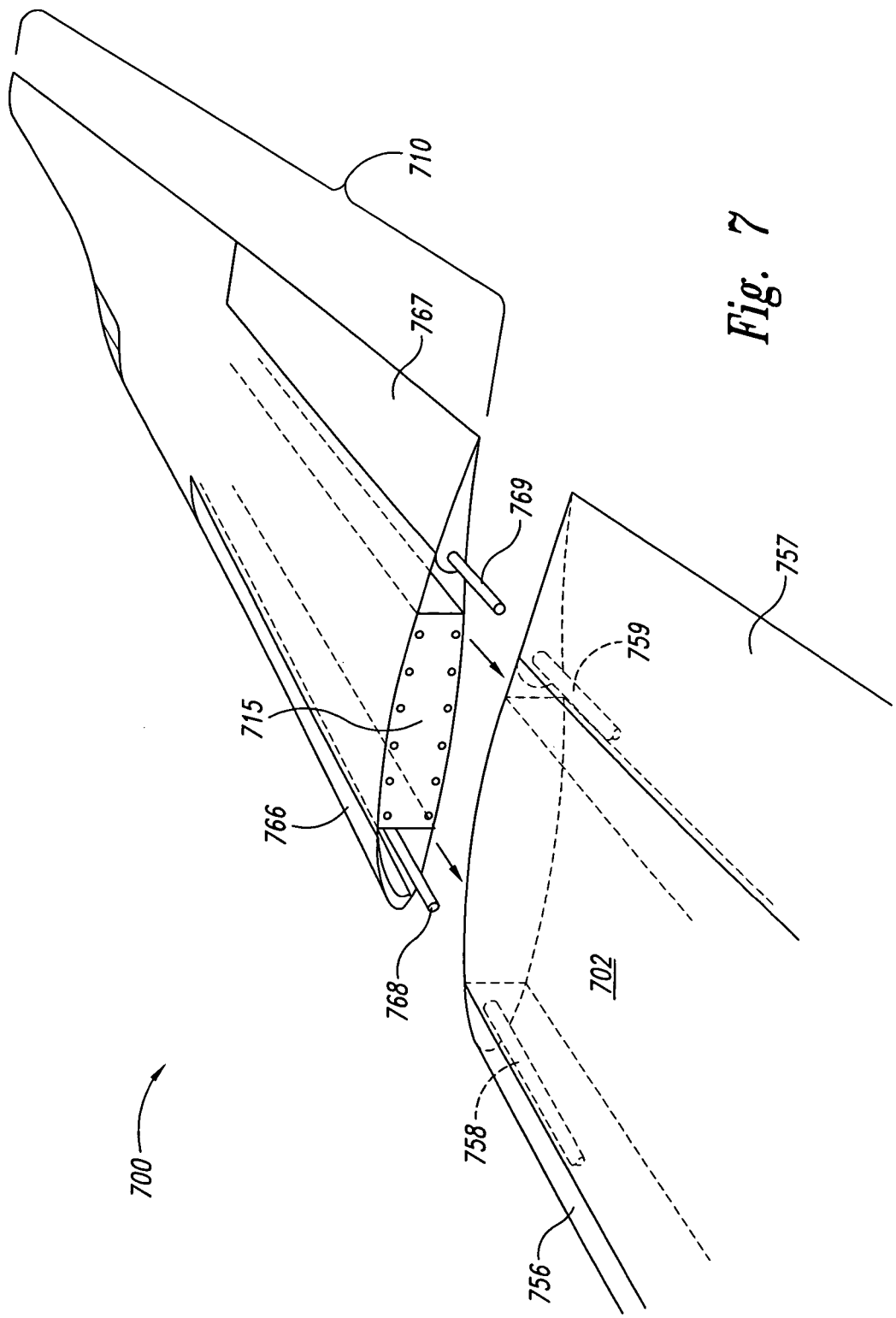
FIG. 7 is an exploded isometric view of a wing and a wingtip extension illustrating a control surface connection configured in accordance with an embodiment of the invention.

FIG. 7 is an exploded isometric view of a derivative wing assembly 700 having a baseline wing 702 and an integrated tip extension 710 configured in accordance with another embodiment of the invention. In this embodiment, the integrated tip extension 710 includes a first leading edge control surface 766 and a first trailing edge control surface 767. The baseline wing 702 similarly includes a second leading edge control surface 756 and a second trailing edge control surface 757. The first leading edge control surface 766 and the second leading edge control surface 756 can be at least generally similar in structure and function to conventional leading edge slats or other types of movable leading edge devices for aerodynamic control. Similarly, the first trailing edge control surface 767 and the second trailing edge control surface 757 can be at least generally similar in structure and function to conventional ailerons, trailing edge flaps, and/or other movable aerodynamic control devices.

The integrated tip extension 710 can further include a first leading edge drive device 768 and a first trailing edge drive device 769 that extend beyond an inboard end portion 715. In one embodiment, the first leading edge drive device 768 can include a drive shaft, torque rod, worm screw, and/or other device that rotates in a first direction for extension of the first leading edge control surface 766 and in a second direction for retraction of the first leading edge control surface 766. Similarly, the first trailing edge drive device 769 can also include a drive shaft, torque rod, and/or other device for rotating, extending, and/or retracting the first trailing edge control surface 767.

When the integrated tip extension 710 is fixedly attached to the baseline wing 702, the first leading edge drive device 768 can be received by, or otherwise engaged with, a second leading edge drive device 758 associated with the second leading edge control surface 756. Similarly, the first trailing edge device 769 can be received by, or otherwise engaged with, a second trailing edge drive device 759 associated with the second trailing edge control surface 757. In the foregoing manner, the first leading edge control surface 766 can be operably coupled to the second leading edge control surface 756, and the first trailing edge control surface 767 can be operably coupled to the second trailing edge control surface 757, so that movement of the respective control surfaces is coordinated during flight.

Figure 8:
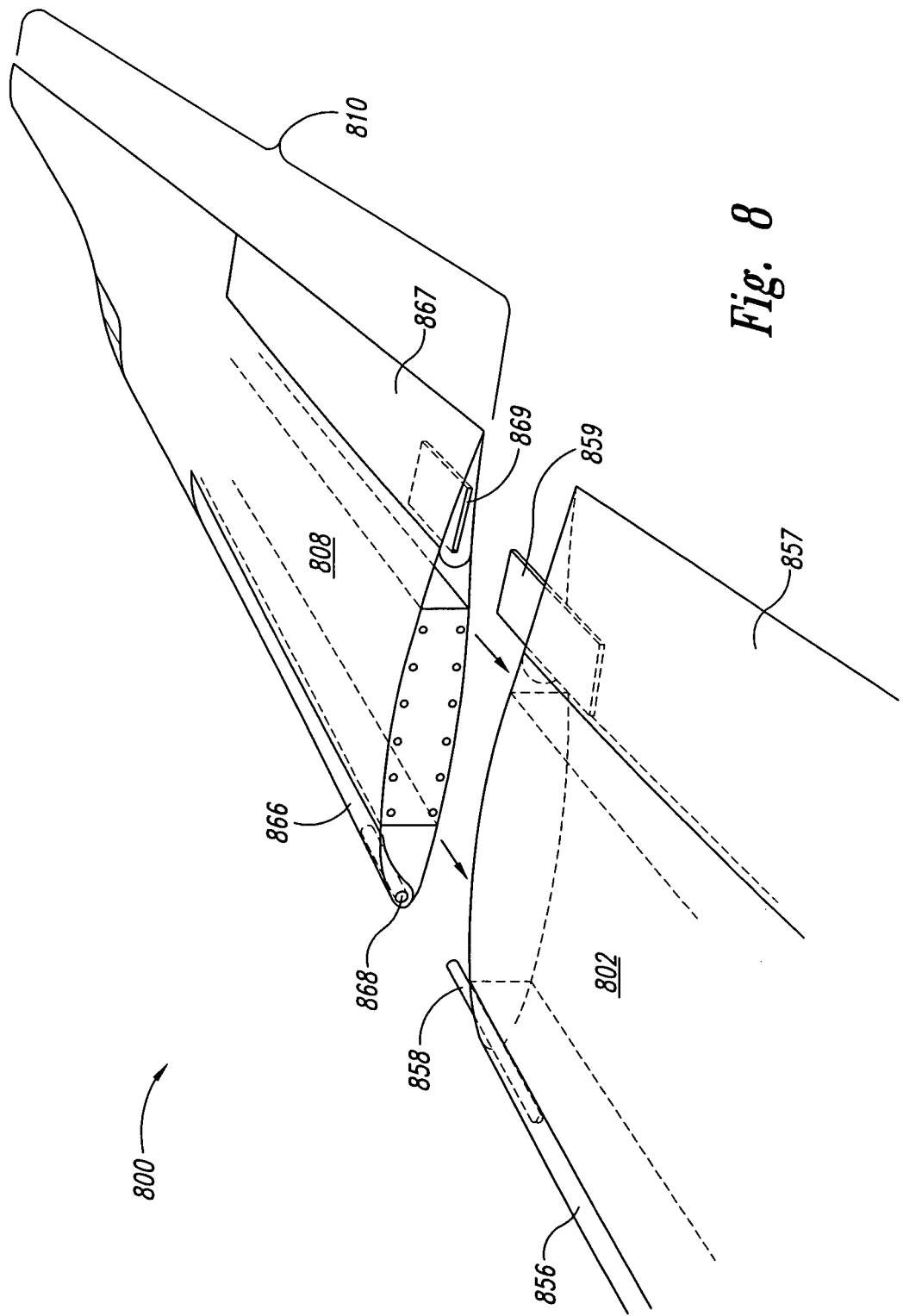
FIG. 8 is an exploded isometric view of a wing and a wingtip extension illustrating a control surface connection configured in accordance with another embodiment of the invention.

FIG. 8 is an exploded isometric view of a derivative wing assembly 800 illustrating another method for operably coupling control surfaces on an integrated tip extension 810 to corresponding control surfaces on a baseline wing 802. In this embodiment, the integrated tip extension 810 includes a first leading edge control surface 866 having a first socket 868, and a first trailing edge control surface 867 having a second socket 869. The baseline wing 802 includes a second leading edge control surface 856 having a first drive feature 858, and a second trailing edge surface 857 having a second drive feature 859.

When the integrated tip extension 810 is fixedly attached to the baseline wing 802, the first drive feature 858 is received in the first socket 868 to operably couple the first leading edge control surface 866 to the second leading edge control surface 856. Similarly, the second drive feature 859 is received by the second socket 869 to operably couple the first trailing edge control surface to the second trailing edge control surface. This method of operably coupling control surfaces together may be advantageous for use with integrated tip devices having relatively short-spans.

Figure 9:
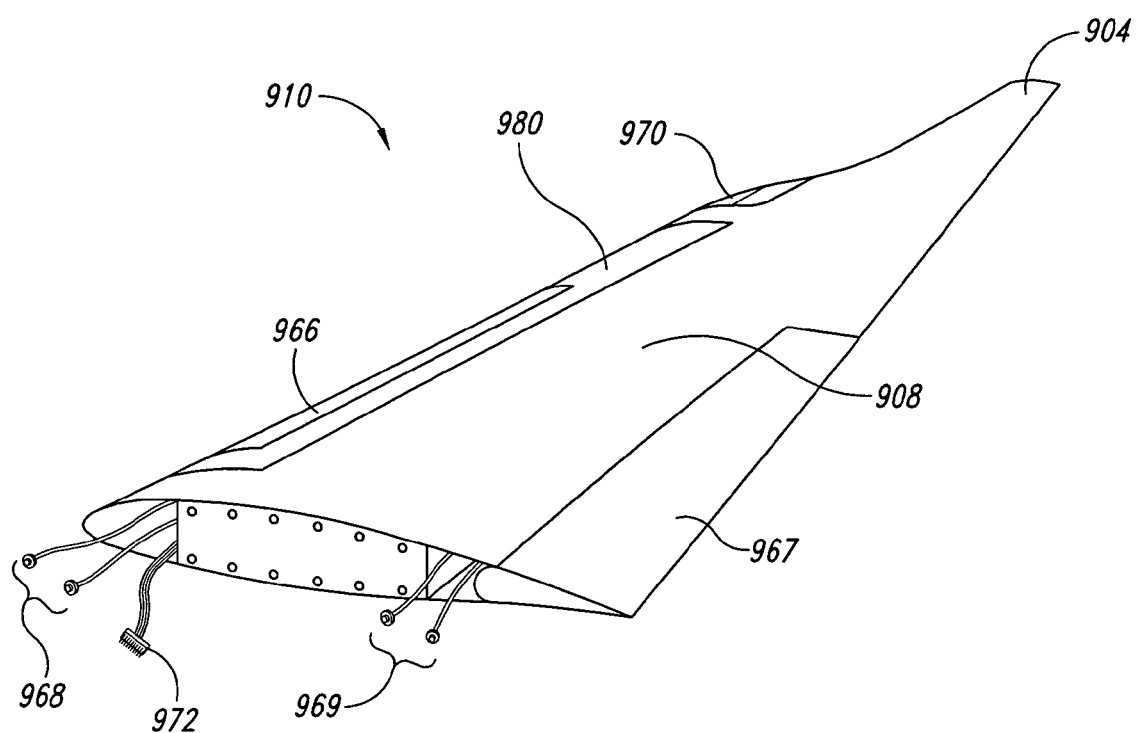
FIG. 9 is an isometric view of an integrated wingtip extension and associated electrical and/or hydraulic system connectors configured in accordance with an embodiment of the invention.

FIG. 9 is an isometric view of an integrated tip extension 910 configured in accordance with another embodiment of the invention. The integrated tip extension 910 can be at least generally similar in structure and function to one or more of the integrated tip extensions described above. For example, the integrated tip extension 910 can include a winglet 904 fixedly attached to a tapered wing section 908. Further, the integrated tip extension 910 can also include a leading edge control surface 966 and a trailing edge control surface 967 which can be operably coupled to corresponding control surfaces on a baseline wing (not shown). In addition, the integrated tip extension 910 can further include a leading-edge deicing system 980 and/or one or more light assemblies 970. The light assemblies 970 can include navigation lights and/or position lights that are at least generally similar in structure and function to conventional navigation/position lights found on various types of commercial, military, and/or civilian aircraft.

The integrated tip extension 910 of FIG. 9 illustrates the "integrated" nature of the present invention. For example, all, or at least many, of the systems necessary for operational use of the tip extension 910 (e.g., the light assemblies 970, the deicing system 980, the winglet 904, etc.) are pre-installed during the manufacturing phase. This enables the tip extension 910 to be retrofitted or otherwise installed on a baseline aircraft wing relatively quickly with a minimum of downtime or expense. To facilitate installation, the integrated tip extension 910 can include one or more power cable connectors 972 for operably connecting the light assembly 970 and/or the deicing system 980 to the aircraft electrical system (not shown). In addition, the integrated tip extension 910 can further include one or more leading edge connectors 968 and one or more trailing edge connectors 969. The leading edge connectors 968 can be used to operably connect the leading edge control surface 966 to a corresponding aircraft control surface operating system (not shown). Similarly, the trailing edge connectors 969 can be used to operably connect the trailing edge control surface 967 to the aircraft control surface operating system. By way of example, if the aircraft control surface operating system includes a hydraulic system, then the leading edge connectors 968 and the trailing edge connectors 969 can include one or more hydraulic connections. Alternatively, if the aircraft control surface operating system utilizes electrical power for control surface actuation, then the leading edge connectors 968 and/or the trailing edge connectors 969 can include one or more electrical connectors. While the various systems discussed above demonstrate the integrated nature of the illustrated embodiment, those of ordinary skill in the relevant art can appreciate that other integrated wingtip extensions configured in accordance with the present invention can include more, fewer, or different flight systems.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

I claim:

1. An aircraft system comprising:
a baseline aircraft main wing having a trailing edge control surface and a distal tip portion spaced apart from a root portion, the distal tip portion being configured to be attached to a first winglet; and
a unitary wingtip extension comprising:
a tapered wing section having an inboard end portion with a first chord length and an outboard end portion with a second chord length that is less than the first chord length, the inboard end portion being fixedly attached to the distal tip portion of the baseline aircraft main wing; and
a second winglet extending from the outboard end portion of the tapered wing section;
the tapered wing section including a trailing edge control surface operably coupled to the trailing edge control surface of the baseline aircraft main wing.

2. The aircraft system of claim 1 wherein the outboard end portion of the tapered wing section is spaced apart from the inboard end portion of the tapered wing section by a spanwise dimension that is at least as long as the second chord length.

3. The aircraft system of claim 1 wherein the tapered wing section further includes a first trailing edge portion and the baseline aircraft main wing further includes a second trailing edge portion, and wherein the first trailing edge portion is configured to be aligned with the second trailing edge portion when the inboard end portion of the tapered wing section is fixedly attached to the distal tip portion of the baseline aircraft main wing.

4. The aircraft system of claim 1 wherein the tapered wing section further includes a first leading edge portion and a first trailing edge portion, wherein the baseline aircraft main wing further includes a second leading edge portion and a second trailing edge portion, and wherein the first leading edge portion is configured to be aligned with the second leading edge portion, and the first trailing edge portion is configured to be aligned with the second trailing edge portion, when the inboard end portion of the tapered wing section is fixedly attached to the distal tip portion of the baseline aircraft main wing.

5. The aircraft system of claim 1 wherein the tapered wing section further includes a first leading edge portion and a first trailing edge portion, wherein the baseline aircraft main wing further includes a second leading edge portion and a second trailing edge portion, and wherein the first leading edge portion of the tapered wing section is configured to sweep aft of the second leading edge portion of the baseline aircraft main wing, and the first trailing edge portion of the tapered wing section is configured to sweep aft of the second trailing edge portion of the baseline aircraft main wing, when the inboard end portion of the tapered wing section is fixedly attached to the tip portion of the baseline aircraft main wing.

6. The aircraft system of claim 1 wherein the tapered wing section further includes a first leading edge control surface and the baseline aircraft main wing further includes a second leading edge control surface, and wherein the first leading edge control surface is configured to be operably coupled to the second leading edge control surface when the inboard end portion of the tapered wing section is fixedly attached to the tip portion of the baseline aircraft main wing.

7. The aircraft system of claim 1 wherein the trailing edge control surface of the tapered wing section comprises a first trailing edge control surface and the trailing edge control surface of the baseline aircraft main wing comprises a second trailing edge control surface, and wherein the first trailing edge control surface is configured to be operably coupled to the second trailing edge control surface when the inboard end portion of the tapered wing section is fixedly attached to the tip portion of the baseline aircraft main wing.

8. The aircraft system of claim 1 wherein the tapered wing section further includes a first leading edge control surface, and the trailing edge control surface of the tapered wing section comprises a first trailing edge control surface, wherein the baseline aircraft main wing further includes a second leading edge control surface, and the trailing edge control surface of the baseline aircraft main wing comprises a second trailing edge control surface, and wherein the first leading edge control surface is configured to be operably coupled to the second leading edge control surface, and the first trailing edge control surface is configured to be operably coupled to the second trailing edge control surface, when the inboard end portion of the tapered wing section is fixedly attached to the tip portion of the baseline aircraft main wing.

9. The aircraft system of claim 1 wherein the tapered wing section further includes a first navigation light system and the baseline aircraft main wing further includes a second navigation light system, and wherein the first navigation light system is configured to be operably connected to the second navigation light system when the inboard end portion of the tapered wing section is fixedly attached to the tip portion of the baseline aircraft main wing.

10. The aircraft system of claim 1 wherein the tapered wing section and the second winglet are integrally formed from composite materials.

11. The aircraft system of claim 1:
wherein the tapered wing section and the second winglet are integrally formed from composite materials;
wherein the tapered wing section further includes a first leading edge portion, a first trailing edge portion, a first leading edge control surface, and a first light system, and wherein the trailing edge control surface comprises a first trailing edge control surface;
wherein the baseline aircraft main wing further includes a second leading edge portion, a second trailing edge portion, a second leading edge control surface, and a second light system, and wherein the trailing edge control surface comprises a second trailing edge control surface; and
wherein the first leading edge portion of the tapered wing section is configured to be aligned with the second leading edge portion of the baseline aircraft main wing, the first trailing edge portion of the tapered wing section is configured to be aligned with the second trailing edge portion of the baseline aircraft main wing, the first leading edge control surface is configured to be operably coupled to the second leading edge control surface, the first trailing edge control surface is configured to be operably coupled to the second trailing edge control surface, and the first light system is configured to be operably connected to the second light system when the inboard end portion of the tapered wing section is fixedly attached to the tip portion of the baseline aircraft main wing.

12. A derivative aircraft system comprising:
a baseline main wing from a baseline aircraft, the baseline main wing having a trailing edge control surface and a first tip portion spaced apart from a first root portion;
a tapered wing section having a second tip portion spaced apart from a second root portion, the second root portion having a first chord length and the second tip portion having a second chord length that is less than the first chord length;
a winglet;
means for fixedly attaching the second root portion of the tapered wing section to the first tip portion of the baseline aircraft main wing;
means for fixedly attaching the winglet to the second tip portion of the tapered wing section; and
the tapered wing section including a trailing edge control surface operably coupled to the trailing edge control surface of the baseline aircraft main wing.

13. The derivative aircraft system of claim 12 wherein the winglet and the tapered wing section are an integral composite structure.

14. The derivative aircraft system of claim 12 wherein the baseline main wing further includes a first leading edge portion and a first trailing edge portion, wherein the tapered wing section further includes a second leading edge portion and a second trailing edge portion, and wherein the first leading edge portion is configured to be aligned with the second leading edge portion, and the first trailing edge portion is configured to be aligned with the second trailing edge portion, when the second root portion of the tapered wing section is fixedly attached to the first tip portion of the baseline aircraft main wing.

15. The derivative aircraft system of claim 12, further comprising means for operably coupling the movable control surface carried by the baseline aircraft main wing with the movable control surface carried by the tapered wing section.

16. The derivative aircraft system of claim 12, further comprising: means for operably coupling a first leading edge control surface carried by the baseline aircraft main wing with a second leading edge control surface carried by the tapered wing section; and means for operably coupling the trailing edge control surface carried by the baseline aircraft main wing with the trailing edge control surface carried by the tapered wing section.

17. The derivative aircraft system of claim 12 wherein the winglet is a second winglet, and wherein the first tip portion of the baseline aircraft main wing is configured to be fixedly attached to a first winglet.

18. A derivative wing assembly comprising:
a baseline aircraft main wing having a first leading edge portion, a first trailing edge portion, and a trailing edge control surface, wherein the baseline aircraft main wing further includes a tip portion configured to be fixedly attached to a first winglet that extends from the tip portion at an angle relative to the baseline aircraft main wing; and
an integrated wingtip extension fixedly attached to the tip portion of the baseline aircraft main wing to increase the wing area of the baseline aircraft main wing, wherein the integrated wingtip extension includes:
a tapered wing section having an outboard end portion spaced apart from an inboard end portion by a spanwise dimension, wherein the inboard end portion has a first chord length and the outboard end portion has a second chord length that is less than the first chord length, wherein the second chord length is also less than the spanwise dimension, and wherein the tapered wing section further includes a second leading edge portion and a second trailing edge portion, wherein the second leading edge portion is aligned with the first leading edge portion and the second trailing edge portion is aligned with the first trailing edge portion when the inboard end portion of the tapered wing section is fixedly attached to the tip portion of the baseline aircraft main wing;
a second winglet extending from the outboard end portion of the tapered wing section; and
the tapered wing section including a trailing edge control surface operably coupled to the trailing edge control surface of the baseline aircraft main wing.

19. The derivative wing assembly of claim 18 wherein the tapered wing section and the second winglet are integrally formed from composite materials.

* * * * *